United States Patent [19]

Link et al.

[11] 4,317,394
[45] Mar. 2, 1982

[54] ARRANGEMENT FOR LOADING AND UNLOADING WORKPIECES OF MACHINE TOOLS

[75] Inventors: Helmut F. Link, Aichwald; Paul Waiblinger, Esslingen, both of Fed. Rep. of Germany

[73] Assignee: Index-Werke KG Hahn & Tessky, Esslingen, Fed. Rep. of Germany

[21] Appl. No.: 100,538

[22] Filed: Dec. 5, 1979

[30] Foreign Application Priority Data

Dec. 14, 1978 [DE] Fed. Rep. of Germany ....... 2853949

[51] Int. Cl.³ ............................................. B23B 13/02
[52] U.S. Cl. ....................................... 82/2.5; 82/2.7; 51/215 H
[58] Field of Search .............. 82/2.5, 2.7; 51/215 AR, 51/215 HM, 215 H

[56] References Cited

U.S. PATENT DOCUMENTS 2,813,380  11/1957  Narel et al. .................... 82/2.5 X
3,658,190  4/1972   Fournier ........................ 82/2.5
4,082,018  4/1978   Russell et al. .................. 82/2.5

FOREIGN PATENT DOCUMENTS 1954487  3/1974  Fed. Rep. of Germany .
1400208  7/1975  United Kingdom .

OTHER PUBLICATIONS

Maschinenmarkt, Wurzburg, 84 (1978), 41, pp. 809, 810.

Primary Examiner—Leonidas Vlachos
Attorney, Agent, or Firm—Shenier & O'Connor

[57] ABSTRACT

The arrangement for loading and unloading workpieces of machine tools includes a pair of spaced loading arms supported on a carriage for pivoting about a first axis. A pair of spaced unloading arms are also supported on the carriage above the loading arms for pivoting about a second axis parallel to the first axis. Each arm carries a gripper for the workpiece, and each pair of grippers is movable by the associated arms along an arcuate path between an initial position and an end position. The initial positions of the two pairs of grippers are different but the end positions are common. The carriage is movable from a workpiece magazine, where the loading arms pick up an unmachined part and the unloading arms subsequently release a machined part, to a position within the work space of the machine where the unloading arms pick up the machined part and the loading arms subsequently position the unmachined part for machining.

7 Claims, 9 Drawing Figures

ARRANGEMENT FOR LOADING AND UNLOADING WORKPIECES OF MACHINE TOOLS

BACKGROUND TO THE INVENTION

The present invention relates to an arrangement for loading and unloading workpieces of a machine tool, such as an automatic lathe.

A loading and unloading arrangement for a machine tool is described in Volume 8, page 485 of the journal "Fertigungstechnik und Betrieb". In this known arrangement swivel arms carrying workpiece conveying elements are arranged in the work space of the machine tool, opposite to the work spindle and diametrically opposite one another with respect to a work-holding fixture. The workpieces are conveyed to and from a holding fixture along arcuate paths which touch each other tangentially in front of the holding fixture. In this arrangement swivel arms are arranged both on the operating side and on the opposite side of the machine space, a stationary workpiece feeding device being associated with one swivel arm and a stationary workpiece unloading device with the other.

This known loading and unloading arrangement can be used with machine tools such as drilling and milling machines particularly machines with a vertically supported work spindle. However, this arrangement is not suitable for use with automatic lathes, and particularly automatic turret lathes, because of its space requirements and also because it requires feeding and unloading devices which both precede and follow the swivel arms.

Arrangements intended for loading and unloading machine tools equipped with a horizontally-supported work spindle, particularly automatic lathes, are also known. However, for various reasons, these known arrangements are not entirely satisfactory for use with modern machine tools, particularly numerically-controlled machine tools, which offer great flexibility.

Briefly, this is due to the manner in which they handle the workpieces and because these known arrangements have a large space requirement and must be placed adjacent to the machine tool. Accordingly, these known arrangements impede access to the work space of the machine tool so that tool changing is made more difficult and is often necessary, to operate these arrangements, to open and close the machine cover which retains the chips and coolants.

It is an object of the invention to provide a loading and unloading arrangement which forms a functional unit without stationary accessories and which can be accommodated in the work space of a machine tool, particularly of numerically-controlled machine tools and of automatic lathes.

SUMMARY OF THE PRESENT INVENTION

According to the present invention there is provided an arrangement for loading and unloading workpieces of a machine tool, comprising a frame, a first arm supported by the frame for pivoting movement about a first axis, first gripper means carried at the free end of said first arm, a second arm supported by the frame for pivoting movement about a second axis, the second axis being parallel to said first axis, second gripper means carried at the free end of said second arm, and means for pivoting said first and second arms such that said first and second gripper means are moved from respective initial positions to a common end position along respective paths of movement which only intersect at said common end position, wherein said first axis is located above the common end position and below said second axis, the initial position of the second gripper means being spaced above the initial position of the first gripper means, wherein said second arm comprises two flexibly linked arm parts which in the initial position of the second gripper means are arranged at a first angle with respect to one another, and wherein positioning means are associated with said second arm and arranged to increase the angle between said two arm parts during movement of the second gripper means from its initial position to the common end position.

The first and second swivel arms together with the gripper means, are located on the same side relative to the axis of the work spindle of a machine tool in the work space of which the arrangement is installed. The arrangement can be installed such that the work space is freely accessible from the operating side of the machine by installing the arrangement on the side opposite to the operating side.

The mutually opposing circular pivoting motions of the gripper means between their two initial positions and the common end position for feeding and removing workpieces make it possible to change workpieces in the shortest time whilst requiring limited space.

Preferably, the common end position is substantially located on the axis of the work spindle. This, together with the fact that the gripper means move along different arcuate paths enables the arrangement to position workpieces to be machined in the work space of the machine and to remove machined workpieces. The arrangement can be operated automatically and it is not necessary to open the cover of the machine.

The lower swivel arm can be pivoted between its end and initial positions in the opposite direction to the pivoting movements of the upper swivel arm. If the arrangement is installed into the work space of the machine as a component of the machine, it can be constructed such that the workpieces to be machined or those which have been machined, can be fed to the machining position, or removed therefrom, manually or automatically.

In one embodiment, the arrangement has a single upper and a single lower arm, each carrying a respective gripper. This embodiment is particularly suitable for handling workpieces with short axial lengths.

Where workpieces are fed in and removed automatically, one gripper means will be ready in its initial position, located at a radial distance from the work spindle, to accept an unmachined workpiece from a conveying device, whilst the other gripper means, in its initial position, will hold a machined workpiece to be deposited in the conveying device. In this case the conveying device is constructed so that it is able to hand over an unmachined workpiece and to accept a machined workpiece.

Preferably, the arrangement is formed as a constructional unit arranged in the work space of the machine. This unit, or a support therefor, is adjustable parallel with respect to the axis of the work spindle in the work space of the machine. Accordingly, the workpieces can be introduced for clamping into a chuck of the work spindle and released therefrom.

In an embodiment designed for handling relatively long workpieces, upper and lower swivel arms of identical construction are provided which are arranged in pairs spaced from one another and each of which carries a respective gripping means. The spacing of each pair of gripper means is adjusted in accordance with the length of the workpieces to be handled to ensure that the workpieces are held stable.

The arrangement acts to place the relatively long workpieces into an opened guide rest located in the machine work space. Preferably, the swivel arms are supported on a portal carriage which is supported in a suspended manner and which is arranged to slide on a guide inside the machine cover. A work magazine is provided laterally on the machine tool and makes the workpieces to be machined available to a pair of grippers of the portal carriage in a predetermined transfer position. The work magazine can supply and remove the workpieces either transversely from below, vertically upwardly or horizontally. The common end position of the gripper means is arranged to coincide with the transfer position of the work magazine.

Constructing the support of the arrangement as a portal carriage offers the advantage that workpieces with a peripheral flange can be offset with respect to one another in the axial direction in the work magazine, and can thus be deposited with relatively little axial spacing with respect to one another by directing the portal carriage at the work magazine sequentially into different transfer positions.

Similarly, workpieces with a peripheral flange can be transported axially offset in the portal carriage so that flange diameters, which in themselves are too great, of workpieces cannot collide with each other when the grippers are swinging in and out.

At the transfer position the work magazine can be fitted with a lifting station which permits machined and redeposited workpieces to be turned by 180° and to be fed back to the work spindle for the purpose of double-sided machining. If the support is used as a conveyor, a further advantage arises out of the fact that the work space of the machine is fully accessible without any hindrance during the time the portal carriage is at the work magazine.

BRIEF DESCRIPTION OF THE DRAWINGS

An embodiment of the present invention will hereinafter be described, by way of example, with reference to the accompanying drawings, in which.

DESCRIPTION OF A PREFERRED EMBODIMENT

Figure 1:
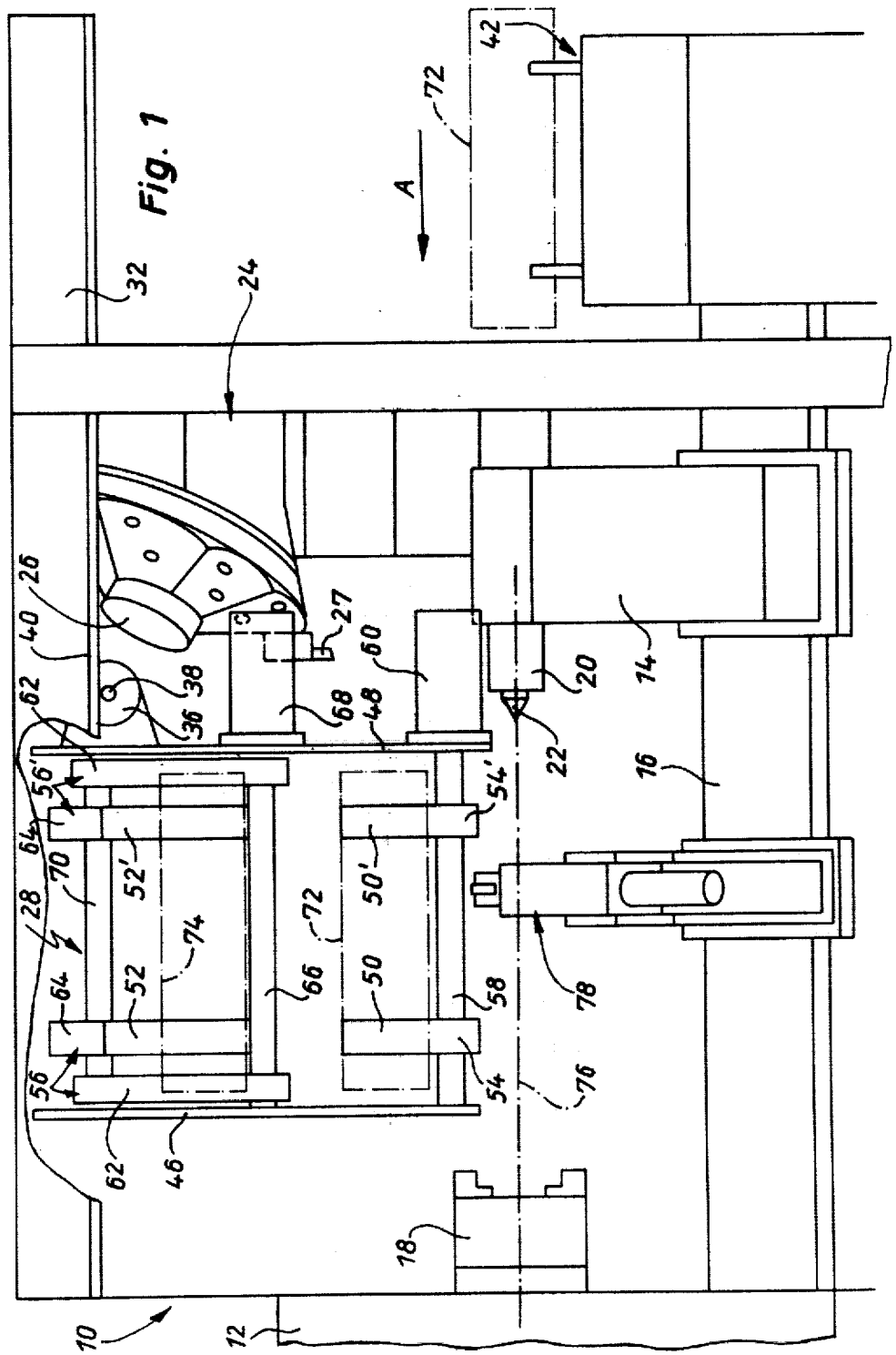
FIG. 1 shows a front view of a numerically-controlled turret lathe with a loading and unloading arrangement installed in its work space and simultaneously forming a work-conveying device.

The whole of the frame of the lathe shown in FIG. 1 is designated by 10. On this frame a headstock 12 and, opposite to this, a tailstock 14 are provided. The tailstock 14 is adjustable and lockable along a horizontal guide track 16 relative to the headstock. A work spindle is supported in the headstock 12 to be driveable in rotation and, in the example shown, carries a chuck 18 at its front end. A sleeve 20 in which there is a tail centre 22 is arranged in the tailstock 14. The centre 22 is aligned with the work spindle. Obliquely above the tailstock 14 there is a turret slide, designated as a whole by 24, having a turret head 26 for accommodating machining tools 27.

As shown in FIG. 1, in the work space of the lathe, the construction of which in itself is known, a loading and unloading arrangement, designated as a whole by 28, is installed. The arrangement feeds workpieces automatically into the work space to be clamped in the chuck for machining and removes the workpieces from the work space after they have been machined. In the embodiment illustrated, this arrangement is designed for the supply and removal of rod- or shaft-shaped workpieces. For this purpose the arrangement 28 simultaneously forms a portal carriage which is supported to be slideable between guide rails 32, 34 arranged at the top of a protective housing 30 which can be closed at the operating side. The carriage is driven by an electric drive motor 36, shown in FIG. 1, on the shaft of which a pinion 38 is mounted to rotate therewith and mesh with a stationary upper rack 40.

Figure 2:
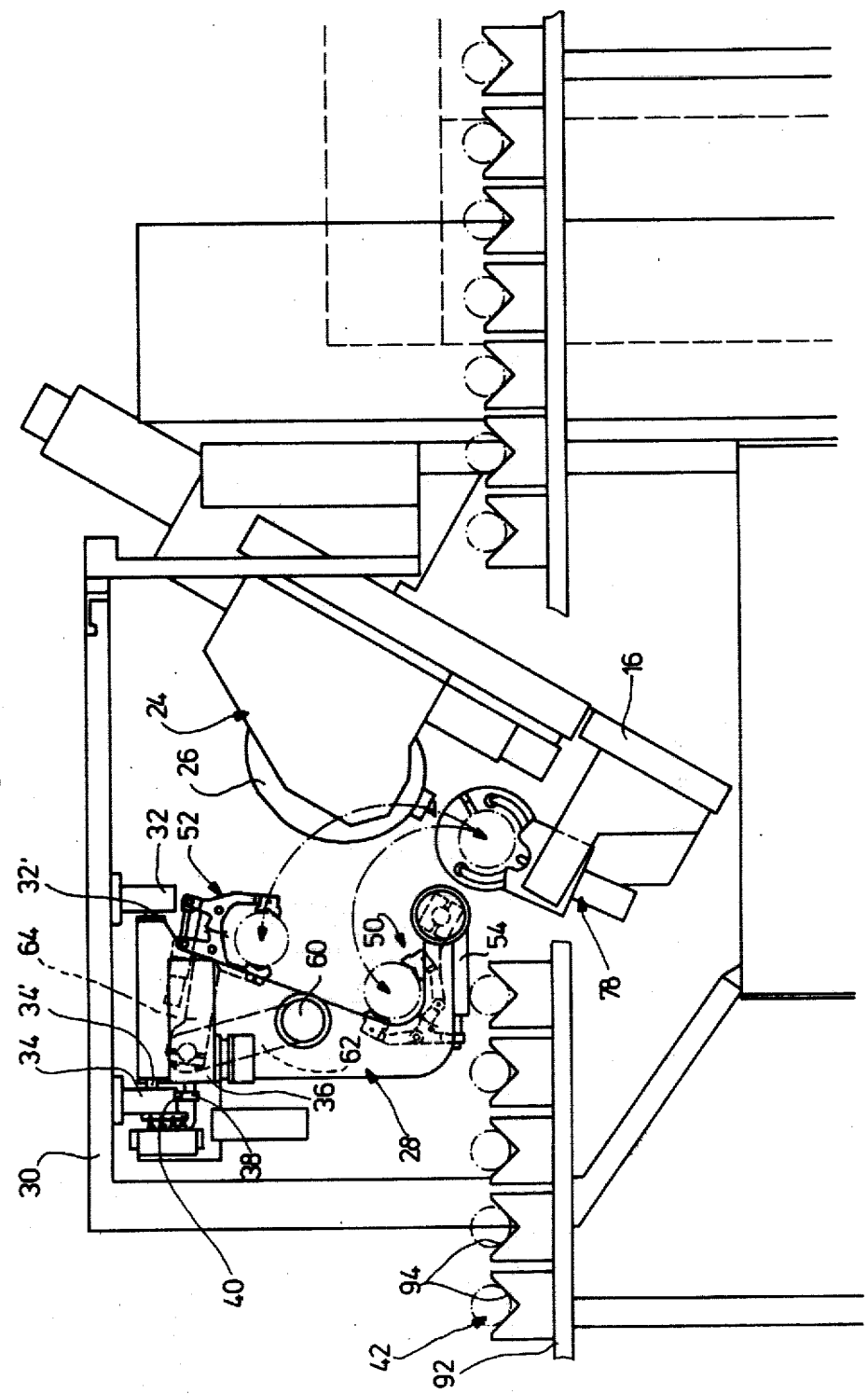
FIG. 2 shows a view of the lathe taken in the direction of arrow A in FIG. 1, the tailstock and part of the work magazine being omitted for clarity.

As shown in FIG. 2, the guide rails 32, 34 are arranged at the operating side of the lathe so far in front of the turret slide 24 that the portal carriage of the arrangement 28 can be driven past the turret slide and over the tailstock 14 into a transfer position above a work magazine, designated as a whole by 42, which makes parts which are to be machined available at the transfer position in which they are accepted by the arrangement and then fed to the chuck 18 of the lathe for clamping.

The construction of the loading and unloading arrangement 28 will now be described in detail.

The portal carriage of the arrangement 28 is provided with two side plates 46, 48 which are rigidly joined to one another. The plates are supported to slide on the guide rails 32, 34 by guide gibs 32', 34'. Between the side plates two pairs of grippers 50, 50', 52, 52' are mounted, one pair 52, 52' being spaced above the other pair 50, 50'. Each gripper is carried by a swivel arm which can be pivoted about an axis which is parallel to the axis of the work spindle. The swivel arms carrying the grippers 50, 50' of the lower pair of grippers are designated by 54, 54', whilst the swivel arms associated with the grippers 52, 52' of the upper pair of grippers are as a whole designated by 56, 56'.

The lower grippers 50, 50' each form a constructional unit with their associated swivel arm 54, 54', these constructional units being arranged at a distance from one another on a common support shaft 58, supported between the side plates 46, 48 to be rotatable and axially adjustable, and to be lockable in position. The support shaft 58 can be rotated between two end positions, seen in FIGS. 6 and 7, by a drive device 60 mounted on the side plate 48.

The swivel arms 56, 56' of the upper pair of grippers are in each case formed of two arm parts 62 and 64 which are flexibly linked to one another, the grippers being rigidly connected to the arm part 64.

Analogously to the swivel arms 54, 54', the arm parts 62 are located on a common support shaft 66 which is arranged parallel to the support shaft 58 and are arranged to rotate with it but not to be axially displaceable. The support shaft 66 can be swivelled to and fro between a first and a second end position, seen in FIGS. 4 and 5, by its own drive device 68 in the same manner as the support shaft 58.

The arm parts 64 carrying the grippers 52, 52' are provided on a common holding shaft 70 which is arranged between and supported in the arm parts 62 of the two swivel arms, the shaft 70 being rotatable and axially displaceable and lockable.

Figure 8:
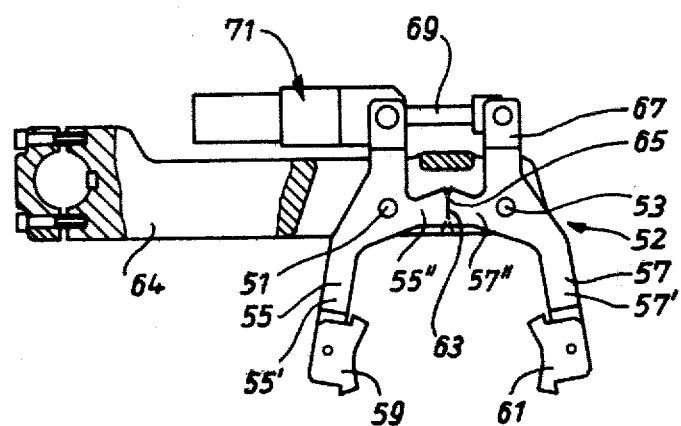
FIGS. 8 and 9 each show a side view, partly in section, of one gripper of the two pairs of grippers.
Figure 9:
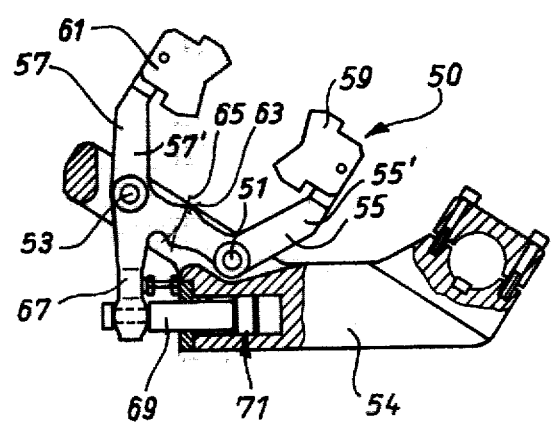

The construction of the grippers of both pairs will now be described in detail with respect to FIGS. 8 and 9. All of the grippers are identical in construction, and each has two gripper arms 55, 57 each in the form of a two-armed lever which can be pivoted about a respective axis 51, 53. The two axes 51, 53 extend parallel with respect to each other. One lever arm 55', 57' of each gripper arm 55, 57 carries a respective clamping jaw 59, 61, whilst the other lever arm 55", 57" carries a respective gear rim 63, 65. The gripper arm 57 of each gripper is provided with a projecting arm 67 which is engaged by a piston rod 69 of a cylinder/piston unit 71. By adjusting the piston rod 69 the two gripper arms 55, 57 can be simultaneously pivoted through the same angular distance and thus applied simultaneously to the periphery of an unmachined or machined workpiece. This prevents the gripper arms 55, 57 being radially displaced with respect to one another during gripping.

In the illustrated arrangement, the grippers 50, 50' of the lower pair are used for gripping a workpiece to be machined which is in the form of a shaft, is designated 72, and hereinafter referred to as an unmachined part. The grippers 52, 52' of the upper pair are used for gripping a workpiece which has been machined, is designated 74 and hereinafter referred to as a machined part.

Because the swivel arms of the lower and upper pairs of grippers are each arranged on a respective support shaft 58, 66 the gripper arms travel over an arcuate path between first and second end positions. The grippers of each pair are swung to and fro between these two end positions together. The support shafts 58, 66 are arranged in the portal carriage in such a manner that the circular swivelling movements of the pairs of grippers from their first end position, shown in FIG. 4, to their respective second end position shown in FIG. 5 or 6, take place in a predominantly downward direction. In their first end positions the two pairs of grippers hold the unmachined part 72 and the machined part 74 at different radial distances from the axis, designated by 76, of the work spindle. However, in their second end positions the pairs of grippers hold their respective parts in the same position, that is, coaxially with respect to the axis 76 of the work spindle.

As the pivoting movements of the two pairs of grippers from their first end positions into their second end positions take place in a predominantly downward direction the unmachined parts can be introduced automatically for machining into an opened guide rest, designated as a whole by 78, which is located in the work space of the lathe, without it being necessary to move this guide rest from its position of use shown in FIG. 2 into a lower release position.

The swivel arms 56, 56' could be constructed in one piece but in this case they would have to be very long because of the relatively great radial distance of their support shaft 66 from the axis 76 of the work spindle. This would produce an unwieldy structure which would impede the displacement of the portal carriage. For this reason the swivel arms 56, 56' have relatively movable arm parts 62, 64 which makes it possible, with a compact type of construction of the portal carriage, to swing back the upper pair of grippers to such an extent that the portal carriage cannot collide with the other parts of the machine whilst moving along the lathe. The grippers 52, 52' of the upper pair of grippers thus move along an arcuate path 80 the centre of which is arranged eccentrically with respect to the axis of rotation of the support shaft 66. The grippers 50, 50' of the lower pair of grippers move along an arcuate path 82 which is arranged concentrically with respect to the axis of rotation of the support shaft 58. Accordingly, the second end position of both pairs of grippers is located at the point of intersection of the two paths 80, 82 and this point of intersection lies on the axis 76 of the work spindle.

Figure 3:
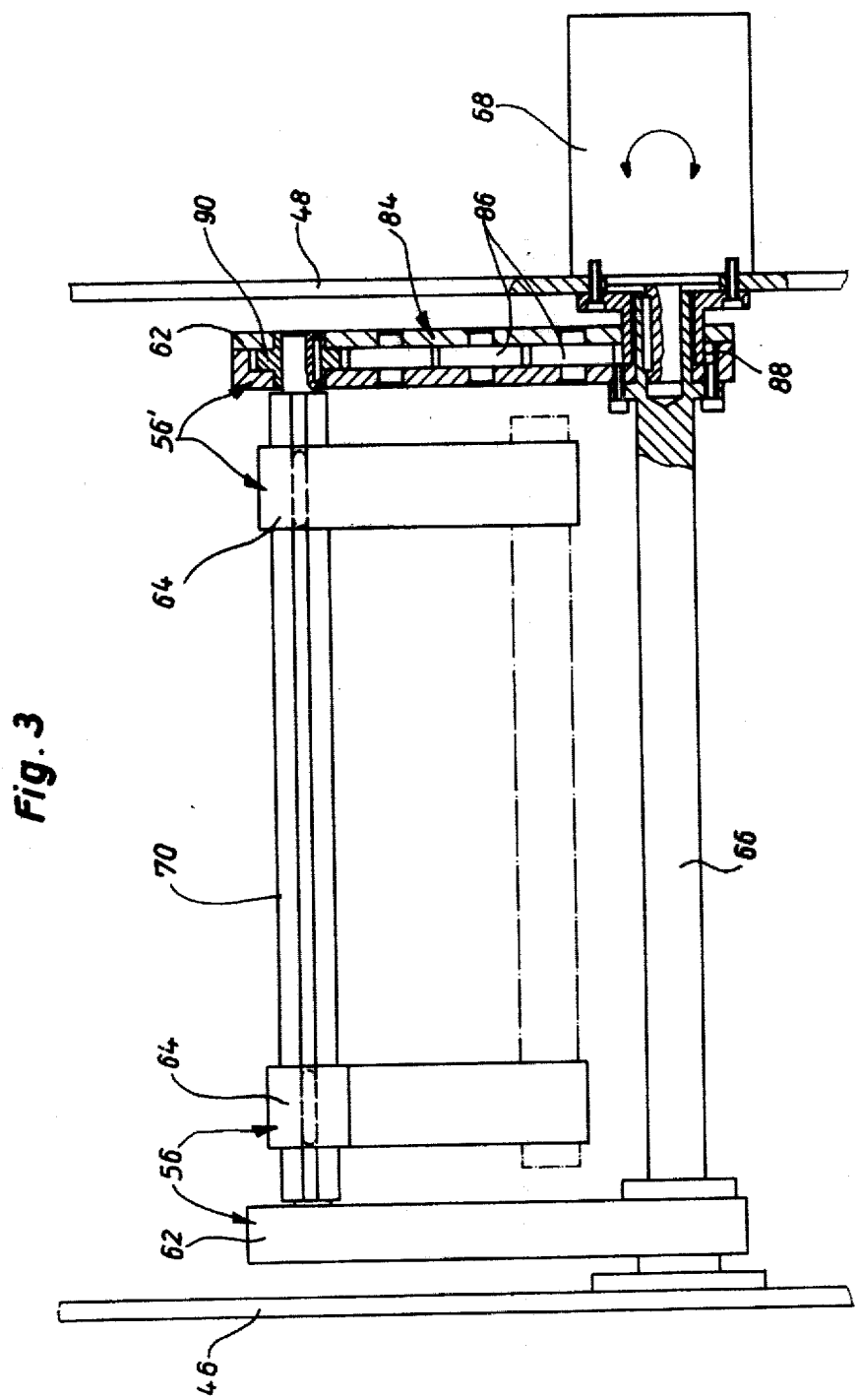
FIG. 3 shows a partial front view of the portal carriage of the arrangement, shown partly in section.

The upper pair of grippers are moved along the path 80 by way of a positioning device 84 shown in FIG. 3. This device 84 is mounted within the arm parts 62 of the swivel arms 56, 56' and comprises a plurality of interengaging toothed wheels 86 supported in the arm parts 62. The lower toothed wheel 86 meshes with a toothed wheel 88 which is mounted on the sideplate 48 and fixed against rotation. The upper toothed wheel 86 meshes with a toothed wheel 90 arranged to rotate the holding shaft 70 to pivot the arm parts 64 relative to the arm parts 62. When the drive device 68 is operated to rotate the shaft 66 the arm parts 62 are pivoted and the toothed wheel 88 thus drives the lower toothed wheel 86 which causes the other toothed wheels 86 and the toothed wheel 90 to be rotated. The gear train formed by toothed wheels 88, 86, 90 thus rotates the holding shaft 70 upon pivotal movement of the arm parts 62. The rotation of the holding shaft 70 together with the pivoting movement of the arm parts 62 caused by the rotation of the support shaft 66 produces the arcuate path 80 of the grippers.

The transmission ratio of the toothed wheels 88 and 90 is chosen such that the unmachined and machined parts 72, 74 do not come into contact with one another during workpiece transfers.

The work magazine 42 provided at the end of the lathe opposite to the headstock 12 is provided with a conveyor belt 92 which can be moved vertically with respect to the axis 76 of the work spindle and horizontally and which carries V-blocks 94, arranged behind one another, for supporting unmachined parts to be supplied and machined parts to be conveyed away. The conveyor belt 92 is supported such that each V-block 94 can be adjusted with respect to the axis 76 of the work spindle so that the longitudinal axis of a shaft-shaped workpiece present on an individual V-block is aligned with the axis of the work spindle. For this purpose either the conveyor belt can be adjusted in height to the centre of the spindle, or an adjustable lifting station can raise the workpiece to be taken up by the portal carriage to the height of the spindle.

The operation of the loading and unloading arrangement described will now be explained in detail. Let it be assumed that the lathe has been converted for machining a new series of workpieces and machining is to be started. For this the portal carriage is driven from the work space of the lathe to the right as seen in FIG. 1 over the transfer position of the work magazine at which an unmachined part 72 is available and aligned to the axis of the work spindle. Once the portal carriage has reached this position the drive device 60 is actuated to pivot the lower pair of grippers 50, 50', from its upper first end position, shown in FIGS. 2 and 4, clockwise into its second lower end position for the purpose of gripping the unmachined part. After that this lower pair of grippers is swivelled back counterclockwise into its first end position and the portal carriage is then driven to the left, as seen in FIG. 1, past the turret slide 24, into the work space of the lathe. The portal carriage is stopped in its work position and the lower pair of grippers is again pivoted into its second end position and the unmachined part is adjusted into an approximately aligned position with respect to the axis of the work spindle. The unmachined part is thus located in the opened guide rest 78 between the chuck 18 and the tail centre 22. The portal carriage is then moved on by a small amount in the same direction, that is, to the left, in order to move one end of the unmachined part into the chuck 18. The unmachined part is then clamped in the chuck and centered by the tail centre 22. After the unmachined part has been clamped the lower pair of grippers is moved back into its first end position and the portal carriage is again driven over the work magazine which, in the meantime, has brought a further unmachined part into the transfer position. The grippers 50, 50' of the lower pair of grippers again grip this unmachined part, swivel back into the first end position and the portal carriage is again driven back into the work space of the lathe. In the meantime, the lathe has started machining the previously located part. During this machining therefore, a fresh unmachined part is already being held available in the work space of the lathe so that, after a machining operation has been completed, another unmachined part can be machined in the shortest time.

Figure 4:
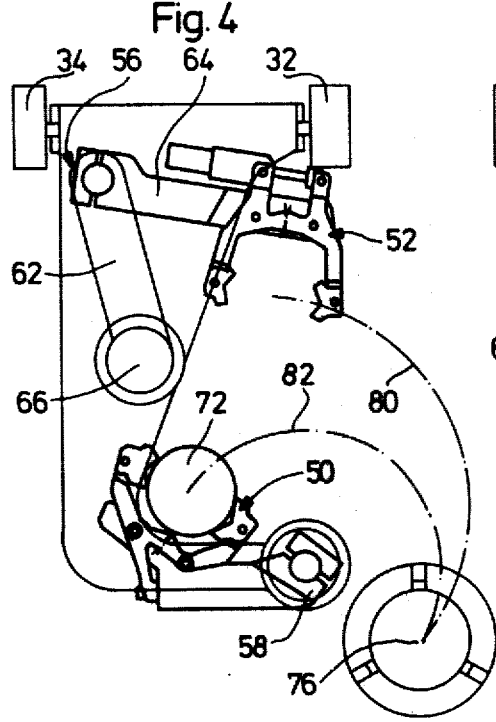
FIGS. 4 to 7 each show an end view of the portal carriage of FIG. 2 illustrating the various steps in executing a workpiece transfer.
Figure 5:
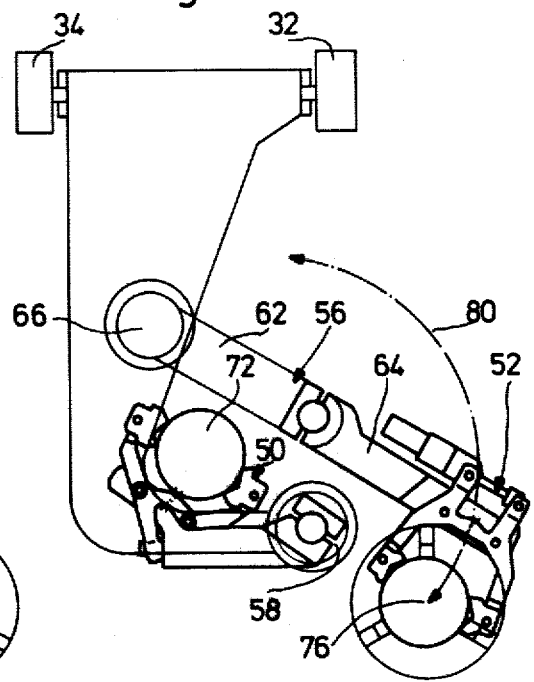
Figure 6:
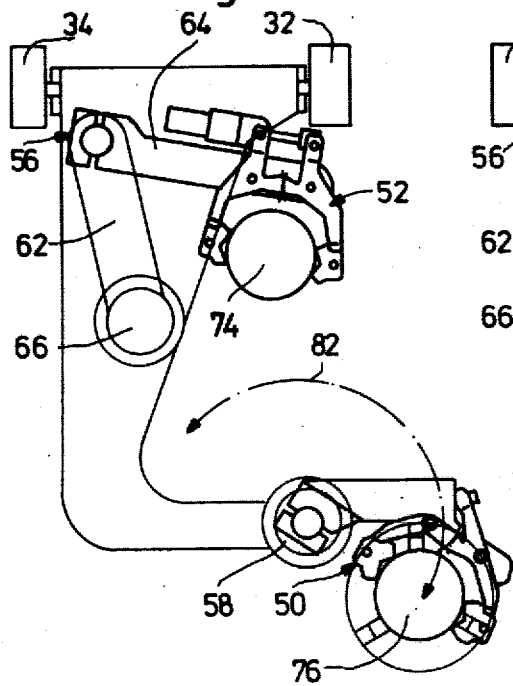
Figure 7:
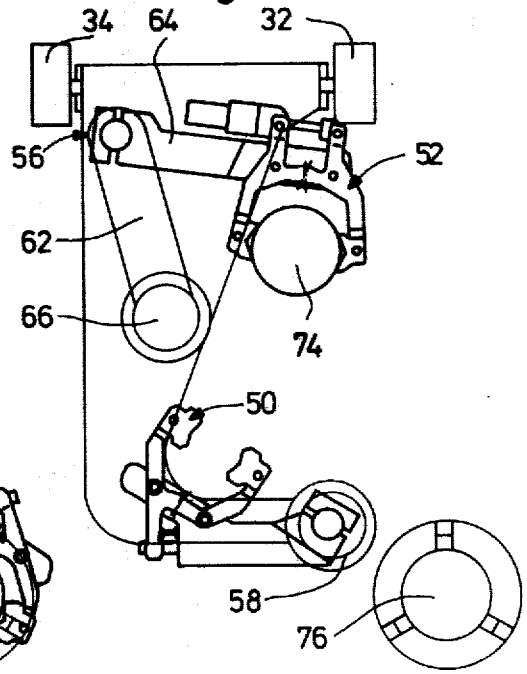

After the first workpiece has been machined the grippers 52, 52' of the upper pair of grippers come into action and are moved from their first upper end position shown in FIG. 4 along the path 80 into their second lower end position shown in FIG. 5. The positioning device 84 ensures that the gripper arms of the grippers 52, 52' are located in a symmetrical position with respect to the axis of the work spindle. After the machined part has been gripped the portal carriage is moved slightly to the right, as seen in FIG. 1, within the work space of the lathe, in order to release the one end of the machined part from the chuck 18. After that the grippers 52, 52' are pivoted back into their first end position, shown in FIG. 6, during which pivoting movement the fresh unmachined part held by the grippers 50, 50' can be swung into the machining position as shown in FIG. 6 and can be placed into the guide rest. After that the portal carriage is again moved towards the chuck 18, so that this new unmachined part can be clamped and centred, Thereafter, the lower pair of grippers is again moved back into its first end position as seen in FIG. 7. The lathe then commences to machine the new unmachined part and the portal carriage is again driven to the work magazine and the grippers 50, 50' again pick up the available unmachined part at the transfer position. The grippers 52, 52' then deposit the machined part into the same V-block 94 from which the grippers 50, 50' have just removed the unmachined part. The machined part will, of course, be moved by the work magazine away from the transfer position when the work magazine positions the next unmachined part in the transfer position. The portal carriage is subsequently moved back to the work space of the lathe and, after machining is finished, the upper pair of grippers picks up the machined part, and the lower pair of grippers makes a new unmachined part available in the manner described.

We claim:

1. An arrangement for loading workpieces on and unloading workpieces from a machine tool having a frame with a central portion located above the machine tool supporting a carriage for shifting movement generally parallel to the axis of the machine tool, said carriage supporting a loading gripper means and an unloading gripper means, said gripper means provided at their front ends with gripper elements movable along respective paths from initial positions to a common terminal position which only intersect at said common terminal position, characterized in that said gripper means comprise a lower first gripper arm (54) pivotable around an axis (58) parallel to the machine tool axis (76) and an upper second compound gripper arm (56) pivotable around an axis (66) parallel to the machine tool axis (76), said second compound gripper arm comprising two portions (62, 64) having an initial position in which they define a downwardly opening direction, and positioning means responsive to movement of said second compound gripper arm from its initial position to its terminal position for steadily increasing the angle defined by said two portions of said second compound arm.

2. An arrangement according to claim 1, characterized in that the first arm is the loading arm (54) and the second arm the unloading arm (56).

3. An arrangement according to claim 1 or 2, characterized in that the angle between the arm portions (62, 64) of the second gripper arm (56) is in the initial position substantially a right angle.

4. An arrangement according to claim 1, characterized in that the positioning means (84) is provided with a gear train (88, 86, 90) arranged at the arm portions (62, 64).

5. An arrangement according to claim 1, characterized in that at a transverse distance there are provided two equal first and second gripper arms respectively (54, 54'; 56, 56') being rigidly secured to each other and thus adapted to be moved together.

6. An arrangement according to claim 1, characterized in that the carrier is provided for each gripper arm (54, 56) with a drive means (60, 68) being in alignment with the respective axes (58, 56) of the gripper arms (54, 56).

7. An arrangement according to claim 6, characterized in that the drive means (60, 68) are adapted to be operated by a pressure medium.

* * * * *